Jan. 25, 1955
J. G. VOELKER
2,700,601
PROCESS FOR PRODUCING A NATURAL
GAS SUBSTITUTE FROM GAS OIL
Filed July 25, 1951
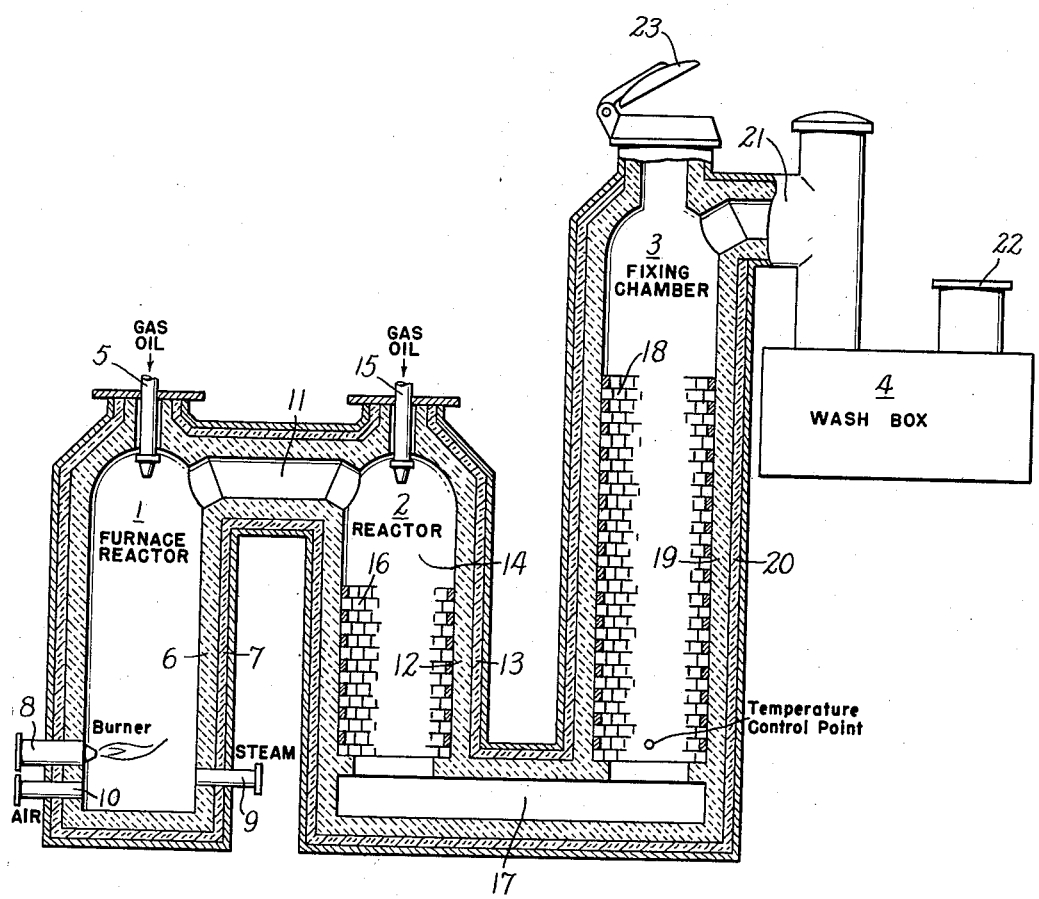
INVENTOR
Joseph G. Voelker
BY
Benjamin Sweedler
ATTORNEY United States Patent Office 2,700,601
Patented Jan. 25, 1955

2,700,601

PROCESS FOR PRODUCING A NATURAL GAS SUBSTITUTE FROM GAS OIL

Joseph G. Voelker, Poughkeepsie, N. Y., assignor to Allied Chemical & Dye Corporation, New York, N. Y., a corporation of New York Application July 25, 1951, Serial No. 238,531

4 Claims. (Cl. 48—214)

This invention relates to the production of combustible gas having the characteristics of natural gas and which can thus be used as a substitute for natural gas or can be blended with natural gas to take care of peak demands from a natural gas system, and this without the necessity of re-adjusting burner appliances which have been set for the satisfactory burning of natural gas. Such combustible gas should have a B. t. u. per cubic foot of from about 800 to about 1100, preferably about 1050, and a specific gravity (air=1) between about .6 and .8, preferably about .68, and is hereinafter termed a high B. t. u. low gravity gas. All numerical B. t. u. references hereinafter are to B. t. u. per cubic foot of gas.

Natural gas has been and is being introduced in certain localities remote from natural gas fields as a relatively low cost fuel for domestic and industrial consumption replacing manufactured gas, particularly carbureted water gas. To supply such localities with natural gas, pipe lines necessarily extending vast distances are employed. The length of these pipe lines and other factors involved in the construction and maintenance thereof preclude the construction of parallel lines as standbys to avert cessation of delivery because of pipe line failure or to augment the normal capacity of the line to meet peak demands. Accordingly, many gas utilities are confronted with the problem of providing standby equipment for manufacturing a natural gas substitute having substantially the same combustion characteristics as natural gas, so that it can be burned efficiently in burner appliances set for the satisfactory burning of natural gas. Many of these gas utilities have carbureted water gas equipment, which, however, can no longer be used to produce carbureted water gas, because such gas cannot be burned satisfactorily with the same burner adjustments as natural gas.

Oil gas, i. e., gas made by cracking oil, has been suggested as a natural gas stubstitute. As heretofore produced oil was introduced on to hot checkerbrick or on to a thick compact layer of small ceramic particles, sometimes called a carbon filtering screen, to effect cracking of the oil. Among the disadvantages of such processes may be mentioned:

1. They frequently result in tars which present emulsion problems when the tars are removed from the gas by passing the gas through the aqueous medium in the washbox.
2. They create a smoke nuisance due to release of smoke from the equipment into the atmosphere.
3. Carbon deposits build up on the checkerbrick or the so-called carbon filtering screen which cannot readily be burned off, or which require interruptions of the gas making operation to effect their removal with consequent diminution of the capacity of the gas making equipment.
4. The checkerbrick and/or the ceramic particles tend to crack and spall in use requiring relatively frequent replacement which adds to the cost of producing the combustible gas.
5. The B. t. u. and specific gravity of the gas produced at times is not close enough to that of the natural gas replaced by or blended with the oil gas to permit satisfactory burning in appliances set for the burning of that particular natural gas. In other words, the gas is not of uniform quality but at times that produced during one period of operation differs substantially from that produced during another period of operation. This results in complaints by consumers and at times necessitates readjustment of the appliances.
6. The gas has an objectionable odor so much so that the small amount of gas which may escape when a gas appliance is turned on is found highly objectionable to the consumer.

It is an object of this invention to provide a process of making a high B. t. u. low gravity gas, which process can be carried out in existing 3-shell carbureted water gas equipment with little modification of such equipment.

Another object is to provide such process which is free of the above noted objectionable features of prior known oil gas processes.

Other objects and advantages of this invention will be apparent from the following detailed description thereof.

In accordance with this invention a process of producing high B. t. u. low gravity gas is provided, which process can be carried out in existing 3-shell carbureted water gas equipment involving a generator, carburetor and superheater located in separate and detached shells and connected in series with little modification of such equipment. The chief modification required is to omit the grate and fuel bed from the generator and provide this unit with a fluid fuel inlet at its base and a gas oil inlet at its top. The carburetor and superheater units generally require no modification. Thus, when an existing 3-shell carbureted water gas set is modified to practice the process of this invention, it comprises (a) a refractory lined chamber, the interior of which is free, i. e., entirely devoid of checkerbrick, fuel bed, or other solid impediment to gas flow and which has fluid fuel, air and steam inlets at its base and a gas oil inlet at its top, (b) a second refractory lined chamber communicating with the top of the aforementioned chamber and provided with a gas oil inlet leading into a free space therein, this chamber having, if desired, checkerbrick for initiating the fixing of the resulting gas disposed so that the gas generated in the free space passes therefrom over the checkerbrick, and (c) a third refractory lined chamber containing checkerbrick, provided with a stack valve and communicating with the second-mentioned chamber and washbox. For convenience the three chambers above noted will be identified herein as a furnace reactor, reactor and fixing chamber, respectively.

The gas oil employed in producing the high B. t. u. low gravity gas in accordance with this invention may have a Conradson carbon number of from .2 to .3 and an API Baumé of from 27° to 34°, usually about 32°. Residuum gas enrichment oil, sometimes termed "light residuum," having a Conradson carbon number of from 3 to 5 and an API Baumé of from 18 to 25, usually about 22, may also be used. In this specification and claims the expression "gas oil" is used to include such residuum gas enrichment oil.

The process of this invention involves chiefly alternating heating and gas making steps. During the heating step any suitable fluid fuel, such as tar, hydrocarbon oils including heavy oils such as bunker C oil or combustible gas is introduced along with air in the base of the furnace reactor and completely burned in its flow up through the furnace reactor, the products of combustion passing from the furnace reactor into and through the reactor and fixing chamber and flowing from the fixing chamber into the stack. When the set has been thus heated to the desired gas making temperature, this heating step is discontinued. Gas oil is then introduced into the top of the furnace reactor and into the free space in the reactor, while a stream of steam is introduced into the base of the furnace reactor and flows up therethrough. Thus, the gas oil is vaporized and cracked in a steam atmosphere in the furnace reactor by radiant heat from the refractory lined walls. The resultant mixture of oil gas and steam flows into the free space in the reactor. The gas oil introduced into this free space is thus vaporized and cracked in this atmosphere of oil gas and steam chiefly by radiant heat emanating from the refractory lined walls of the reactor and, if used, also from the body of checkerbrick therein contiguous to this free space. The resultant gas flows over the checkerbrick, if present, in the carburetor where the fixing of the gas is commenced, and then over the checkerbrick in the fixing chamber where the fixing is completed. From the fixing chamber the gas flows through the washbox, then through the by-product recovery equipment and into the holder or gas distribution system.

From 1.5 to 5 volumes of gas oil are introduced into the reactor for each volume simultaneously introduced into the furnace reactor. Preferred operation involves introducing from 20%–35% of the total gas oil into the furnace reactor and from 65%–85% of the gas oil in the reactor.

It is important to note that in the process embodying this invention the heating gases, i. e., the products of combustion, and the make gas both flow through the set in one and the same direction. When employing a steam purge or a run for removing carbon deposits, which in practice when the set is operated properly is seldom, if ever, necessary, the steam and combustion products produced during the aforesaid carbon removing run flow in the same direction through the set as the heating gas and make gas. In other words, there is a uni-directional flow through the set. This makes for relatively small changes in temperature to which each portion of the set is subjected in operation. Cracking and spalling of the refractory lining and checkerbrick within the set are minimized resulting in generally longer life of the parts of the set and less repair of and maintenance charges for the set. Furthermore, it permits practice of the process in equipment employing unobstructed and permanently free passageways connecting the units, thus increasing the capacity of the equipment in that it eliminates the necessity for shutting down to clean, adjust or replace the valves employed in other oil gas making equipment.

Moreover, in the process of this invention the gas oil of the make is added in minor part to the introduced during the furnace reactor to a stream of steam flowing therethrough and in major part to the reactor to the mixture of oil gas and steam passing therethrough from the reactor. Both parts thus added are vaporized and cracked by radiant heat in the free spaces in these units and the resultant gas is fixed by passage over hot checkerbrick. This mode of operation is believed largely responsible for:

1. Minimization, if not complete elimination, of hot spots throughout the set. These hot spots result in prior oil gas operations due chiefly to deposition of carbon in localized areas, which carbon ignites and burns causing the formation of such hot spots. In the process of this invention carbon which necessarily results from oil cracking is distributed uniformly and is largely consumed during the process, particularly during the heating steps so that it does not build up to the point where it interferes with gas flow through the set, or produces hot spots.

2. Smokeless operation with consequent elimination of the smoke nuisance.

3. Production of a tar substantially free of emulsification tendencies when condensed or washed out of the gas in the conventional washbox.

4. Production of a gas having the desired B. t. u. and specific gravity which properties of the gas remain substantially constant throughout the operation so that the gas can be used as a substitute or replacement for natural gas without requiring adjustment of burner appliances set for burning the natural gas in question.

5. Production of a gas which does not have an objectionable odor.

This invention will be more fully described in connection with the accompanying drawing which discloses a preferred embodiment of a gas generating set for practicing this invention.

Referring to the drawing there is shown a gas generating set comprising a furnace reactor 1, a reactor 2, a fixing chamber 3 and a washbox 4. The furnace reactor 1 differs from the generator of a conventional water gas set chiefly in that it does not contain a grate for supporting a fuel bed and has at its top a gas oil inlet 5. Like such generator it has a refractory lining 6 of fire brick or other high temperature heat resistant material separated from the outer metal walls by a layer of heat insulation 7. The combined thickness of the refractory lining 6 and heat insulation layer 7 is about a foot. The furnace reactor is provided at its base with a burner 8 for supplying fluid fuel, such as tar, hydrocarbon oil including bunker C oil, gas, etc. to the base of the generator. It is also equipped with a steam inlet 9 and an air inlet 10 at its base.

The top of the furnace reactor communicates through an unobstructed refractory lined passageway 11 with the top of reactor 2. This reactor in all essential respects corresponds to the carburetor of a conventional water gas set and is provided with a refractory lining 12 separated from the outer metal walls of the shell defining the reactor by a layer of heat insulation 13. The combined thickness of the refractory lining 12 and insulating layer 13 is approximately one foot.

In the embodiment of the invention shown in the drawing the reactor is provided at its top with a free space 14 into which leads a gas oil inlet 15. Disposed just below the free space 14 is a body of checkerbrick 16. This body of checkerbrick serves to initiate the fixing of the gas passing thereover and aids in vaporizing and cracking the gas oil introduced through inlet 15 by heat radiated therefrom. The body of checkerbrick is so positioned within the reactor that complete vaporization of the gas oil takes place before any liquid gas oil contacts the checkerbrick. In other words, all of the vaporization of the gas oil introduced through gas oil inlet 15 takes place in the free space above the body of checkerbrick 16 by radiant heat emanating from refractory lining 12 and checkerbrick 16.

Reactor 2 communicates with the fixing chamber 3 by means of a refractory lined passageway 17. Fixing chamber 3 in all essential respects corresponds to the superheater of a conventional water gas set. It may contain the usual body of refractory material such as checkerbrick 18, e. g., about 40 courses, each checkerbrick being, for example, 4½ inches thick and has a refractory lining 19 separated from the metal walls by a layer of heat insulation 20. The thickness of the refractory lining 19 and layer of heat insulation 20 may be the same as the thickness of these materials in the reactor and furnace reactor.

Fixing chamber 3 is connected with washbox 4 through an angle connection 21. Washbox 4 is equipped with a gas off-take 22 leading to the by-product recovery equipment, not shown. Fixing chamber 3 is also provided with a stack valve 23.

The dimensions of the furnace reactor, reactor and fixing chamber may be substantially the same as in the case of the generator, carburetor and superheater, respectively, of existing carbureted water gas sets. Thus, the inside diameter of the furnace reactor may be from about 3 feet to about 10 feet, its over-all height from about 14 feet to 19 feet. The reactor may have an inside diameter of from about 3 to about 10 feet and an over-all height of from about 14 to about 21 feet. The fixing chamber may have an inside diameter of from about 2 to about 10 feet and an over-all height of from about 21 to about 32 feet. In general, the smaller the inside diameter of each unit within the range for that unit above noted, the shorter the height within the height range for that unit above noted. The furnace reactor and reactor are of substantially the same height and the fixing chamber of substantially greater height. The height of the free space in the reactor should be at least about 4 feet and preferably about 6 feet or more. These dimensions result in a surface area of refractory lining from which radiant heat emanates effecting vaporization and cracking of the gas oil in the furnace reactor and reactor which area results in most efficient vaporization and cracking of the gas oil.

From the above description of the set it will be appreciated that existing carbureted water gas equipment can readily be modified to practice the process of this invention. Substantially all that is required is to omit the grate and fuel bed from the generator and equip the generator with an oil gas inlet at its top and a fluid fuel burner at its base. It will be understood that while an important feature of this invention is that it may be readily carried out in existing 3-shell carbureted water gas equipment with only minor modifications in such equipment as pointed out above, the invention is not limited thereto and may be practiced in new equipment built for that express purpose.

It is standard practice in the combustible gas generating art to control the gas making operation in accordance with temperature conditions at a selected point in the set. In the practice of this invention the gas making operation is controlled in accordance with temperature conditions at or near the inlet to the fixing chamber which in the embodiment shown on the drawing is at the base of the fixing chamber; this point is indicated on the drawing by the legend "Temperature Control Point" and is hereinafter referred to as the control point.

In accordance with this invention the set is first heated until the temperature at the control point is within the range of 1400° to 1600° F. This is accomplished by turning on the burner 8, supplying enough air to support complete combustion of the fluid fuel. The products of combustion flow up through the furnace reactor 1, down through the reactor 2, up through the fixing chamber 3, exiting through the open stack valve 23. This step may be from 80 to 120 seconds duration. It is preferably followed by a blow run of from 1 to 15 seconds duration during which the products of combustion generated by burning the fluid fuel at the base of reactor 1, pass from the fixing chamber 3 into and through the washbox 4, the stack valve 23 being closed during this blow run. The blow run produces diluent gas for diluting the make gas when it is desired to reduce the B. t. u. of the make gas. This step may of course be omitted when a higher B. t. u. gas is desired. Next a steam purge takes place of from 2 to 7 seconds duration. Steam is admitted to the base of furnace reactor 1 through inlet 9, flows up through the furnace reactor, down through the reactor 2, up through the fixing chamber 3, exiting through the open stack valve 23. Products of combustion within the set are thus purged therefrom.

The make run follows. Gas oil is admitted simultaneously through oil inlet 5 to the top of the furnace reactor and oil inlet 15 into the free space 14 at the top of the reactor 2. Steam is admitted at 9 to the base of the furnace reactor 1. The gas oil introduced through inlet 5 is vaporized and cracked by the radiant heat in furnace reactor 1 in the presence of the steam passing therethrough. This steam is superheated somewhat in its flow up through the furnace reactor and sweeps out the oil gas produced in this unit as fast as the gas is generated. The mixture of steam and gas from furnace reactor 1 enters into the free space 14 in the top of reactor 2. Gas oil introduced through spray 15 is vaporized and cracked by radiant heat in this free space 14 in this atmosphere of gas and steam. The resulting gas mixture passes over the body of checkers 16 where fixing of the make gas is initiated and then flows into and through the fixing chamber 3 where fixing of the gas is completed. From the fixing chamber 3 the resulting high B. t. u. low gravity gas passes into the washbox 4, exiting therefrom through the off-take 22. The make step is continued until the temperature at the control point drops about 100° F., preferably from 100° to 150° F. This make step may be from 70 to 100 seconds duration. Thus, in accordance with this invention the temperature at the control point at the end of the heating step and beginning of the make step is from 1400° to 1600° F. and the temperature at the end of the make step at this control point is from 1300° to 1500° F., respectively. In general, the temperatures in the free space in the reactor and at the top of the furnace reactor are about 400° to 500° F. higher than the temperature at the control point.

Following this make step, the oil sprays 5 and 15 are shut off and steam is introduced through inlet 9 at the base of furnace reactor 1. The steam flows up through the furnace reactor 1, down through reactor 2, up through fixing chamber 3, purging the set from residual gas, the steam gas mixture exiting from fixing chamber 3 into the washbox 4 and then flowing through the off-take 22. This steam purge may be of 20 to 50 seconds duration. This completes one cycle of steps of the preferred process; the steps are repeated in each succeeding cycle.

In the process of this invention from 7 to 13 gallons of gas oil per MCF of make gas are introduced during the make. For a gas having a B. t. u. in the lower portion of the 800 to 1100 range, an amount of gas oil in the lower portion of the 7 to 13 gallon range is employed, and correspondingly for a gas having a B. t. u. in the upper portion of the 800 to 1100 range, an amount of gas oil in the upper portion of the 7 to 13 gallon range is employed. Thus, for a gas having a B. t. u. of about 1000 from 10 to 12 gallons of gas oil per MCF are employed during the make. From 1 to 3 gallons of heating oil per MCF of make gas will be found adequate to supply the heat necessary to bring the various portions of the set to the proper gasification temperatures.

The steam introduced through inlet 9 should be saturated or preferably slightly superheated. Wet steam, i. e., containing free moisture, should not be used. The amount of steam employed is from 5 to 15 pounds, preferably from 8 to 12 pounds, per MCF of make gas.

Some carbon and carbonaceous material are inevitably formed during the vaporization and cracking of the gas oil. Operating in accordance with this invention the amount of carbon and carbonaceous material formed is relatively small. Some of this carbon and carbonaceous material reacts with the steam present to produce blue gas. Carbon and carbonaceous material which does not so react deposits on the walls of the furnace reactor and reactor where it does not interfere with the flow of gas through these units. Very little, if any, carbon and carbonaceous material collects on the checkerbrick in the reactor. Such deposited carbon and carbonaceous material including that on the walls of the furnace reactor and reactor is consumed during a subsequent heating step. Should deposits begin to build up a run of a few seconds, say from 5 to 15 seconds, is carried out by introducing air through inlet 10 at the base of the furnace reactor and passing this air up through the furnace reactor and down through the reactor where it supports combustion of the carbon and carbonaceous deposits. The resultant products of combustion are passed up through the fixing chamber and exit through the stack valve into the atmosphere. This carbon removing run may precede or follow the heating step. In normal operation of this process such run is seldom, if ever, necessary.

The following example is illustrative of a preferred embodiment of the process of this invention. It will be understood the invention is not limited to the example.

The example was carried out in a set of the type shown in the drawing in which the furnace reactor had a 9 ft. outside diameter, the reactor an 8 ft. outside diameter, the fixing chamber an 8 ft. outside diameter and the free space in the reactor a height of 5 feet.

The heating up step was of 50 seconds duration. Air was introduced at a rate of 6000 cubic feet per minute and heating oil at the rate of 9 gallons per minute. The products of combustion passed up through the furnace reactor, down through the reactor and up through the fixing chamber, exiting through the stack valve. At the end of this heating step, the temperature at the control point was 1540° F. The temperatures at the top of the furnace reactor and reactor were 1900°–2000° F.

A blow run of 11 seconds' duration followed. 9 gallons of oil per minute and 4000 cubic feet of air per minute were introduced into the base of the furnace reactor and the products of combustion passed up through the furnace reactor, down through the reactor, up through the fixing chamber and thence into the washbox.

A make run of 78 seconds' duration followed. At the beginning of this run the temperature at the control point was 1540° F. 60 gallons of gas oil were added per minute of which 18 gallons per minute were introduced into the furnace reactor and 42 gallons per minute into the free space in the reactor. 30 pounds of steam per minute were introduced into the base of the furnace reactor, the steam flowing up therethrough sweeping out the oil gas produced by vaporization and cracking of the gas oil in the furnace reactor, the resultant gaseous mixture passing into the top of the reactor in the free space therein. The gas oil introduced into the free space in the reactor was cracked by radiant heat in the presence of the oil gas and steam passing therethrough and the resultant gas mixture flowed down through the reactor, up through the fixing chamber into the washbox. At the end of the make step the temperature at the control point was 1410° F.

A steam purge of 38 seconds duration followed. Steam was introduced into the base of the furnace reactor at 60 pounds per minute and the gas produced by flow of this steam up through the furnace reactor, down through the reactor and up through the fixing chamber was passed to the washbox. This completed the cycle of steps which were then repeated.

The gas produced had a B. t. u. of 1030 and a gravity of .69. Approximately 100,000 cubic feet of gas per hour was produced. Thus, the thermal output of the set was approximately 175% greater than when making carbureted water gas at capacity before modification to embody the present invention.

While the reasons for the advantageous results achieved by this invention are not fully understood, there is good reason to believe they are largely attributable to the mode of operation involving the vaporization and cracking of the gas oil entirely by radiant heat in the furnace reactor and reactor in the presence of steam introduced into the base of the furnace reactor and flowing up through this unit and down through the reactor. In this process gas oil while in the liquid phase is not brought into contact with hot refractory material such as checkerbrick or the ceramic material in a so-called carbon filtering screen.

Such refractory material acts as a catalyst to catalyze the polymerization of unsaturated hydrocarbons produced as a result of the cracking which resultant polymers form tars, pitches, smoke forming and odoriferous constituents. Moreover, when gas oil while in the liquid phase is brought into contact with hot refractory material, the molecules close to the hot surface are overcracked and those relatively remote are undercracked. Non-uniform heating results with formation of objectionable tars, smoke forming and odoriferous constituents. In the process of this invention the vaporization and cracking of the gas oil is carried out in free spaces by radiant heat, uniform heating of the oil results and no formation of polymers occurs, which polymers may be attributed to the above noted catalytic action of hot refractory material. These factors may explain the absence of smoke, the formation of a gas which does not have an objectionable odor and the production of tars which have little or no emulsification tendencies when condensed in the washbox.

As is well known the rate of cracking increases with temperature increases. Employing radiant heat as the source of heat for effecting cracking it is possible to operate at higher temperatures. Heat transfer rates are considerably greater with radiant heat as compared with conducted or convected heat, i. e., gas oil subjected to radiant heat vaporizes and cracks more quickly than when such oil is brought into contact with a hot solid surface and the transfer of heat to the oil is effected chiefly by conduction and convection. The checkerbrick or refractory screen in prior oil gas processes takes up space and impedes the flow of gas. In the process of this invention gas oil is introduced into the reactor in amount from 1.5 to 5 times that introduced into the furnace reactor. Hence, both of these units of the set are utilized most efficiently in effecting vaporization and cracking of the gas oil. To these factors may be attributed in part at least the increase in capacity of the gas making equipment effected by this invention.

Operation on a commercial scale of several months duration confirms the above noted advantages of this process. Such operation has resulted in the production of a high B. t. u. low gravity gas which was blended with natural gas and burned efficiently, and this without the necessity of readjusting the burner appliances set for burning natural gas. The make gas did not have an objectionable odor and was consistently of uniform quality. The operation has been surprisingly free of the above noted difficulties and objections encountered in the production of oil gas. It has consistently resulted in a tar condensed in the washbox, which tar is free of emulsification characteristics, greatly simplifying the handling of this tar. It has been surprisingly clean; no smoke nuisance was involved. The carbon formed during the cracking of the gas oil was distributed uniformly and consumed during the operation, so that there was no interference with gas flow throughout the set or the production of hot spots.

Since certain changes in carrying out the above process may be made without departing from the scope of this invention, it is intended that all matter contained in the above description or shown in the accompanying drawing shall be interpreted as illustrative and not in a limiting sense. Thus, for example, instead of having the top of the reactor connected with the top of the furnace reactor, the top of the latter may be connected with the base of the reactor so that flow takes place up through the reactor instead of down therethrough. The reactor may be connected with the fixing chamber, so that flow takes place down through the latter, rather than up therethrough, as shown in the drawing. If desired, the checkerbrick may be omitted from the reactor, so that the interior of this unit is devoid of obstructions to the flow of gas therethrough.

This application is directed to the species of the invention disclosed and claimed in my copending application Serial No. 238,532 filed the same day as this application, which species involves the utilization of gas oil as the charging stock.

What is claimed is:

1. The process of making a high B. t. u. low gravity combustible gas having the characteristics of natural gas in a three-shell gas generating set in which one shell is a refractory lined chamber, occupying substantially the entire shell, said chamber having the interior thereof throughout its length devoid of checkerbrick and constituted of a free space for unobstructed flow of gas therethrough, and for the cracking of oil in said free space, a second shell is a refractory lined chamber occupying substantially the entire extent of said second shell, said chamber communicating with the first-mentioned chamber and having in the portion thereof communicating with the first-mentioned chamber a large unobstructed free space devoid of checkerbrick for the unobstructed flow of gas therethrough and for the cracking of oil in said free space, said free space in said second-mentioned chamber being of sufficient depth and volume for the cracking of the oil introduced thereinto substantially completely while the oil is in said free space, and the third shell is a fixing chamber extending substantially the full length of said third shell, containing refractory material with voids therebetween and communicating with said second shell, which process comprises heating said chambers by burning a fluid fuel introduced into the first-mentioned chamber and passing the resultant products of combustion through the first-mentioned chamber and through the other two chambers to heat said chambers to gas-making temperatures, and generating said high B. t. u. low gravity gas by passing steam into and through the first-mentioned chamber, introducing gas oil into said free space in the first-mentioned chamber and completely vaporizing said gas oil thus introduced in the free space in said first-mentioned chamber by radiant heat in the presence of said steam passing therethrough, passing the resultant mixture of oil vapors and steam through the second-mentioned chamber, simultaneously with the introduction of the gas oil into the first-mentioned chamber, introducing gas oil into the second-mentioned chamber, the quantity of gas oil thus introduced into the second-mentioned chamber being at least 1.5 times that introduced into the first-mentioned chamber, completely vaporizing the gas oil thus introduced into the second-mentioned chamber while in said free space in said second-mentioned chamber by radiant heat and in the presence of oil vapors and steam passing from the first-mentioned chamber through the second-mentioned chamber, and passing the resultant mixture of oil vapors and steam over the hot refractory material in said fixing chamber to produce the combustible gas.

2. The process of making a high B. t. u. low gravity combustible gas having the characteristics of natural gas in a three-shell gas generating set in which one shell is a refractory lined chamber, occupying substantially the entire shell, said chamber having the interior thereof throughout its length devoid of checkerbrick and constituted of a free space for unobstructed flow of gas therethrough, and for the cracking of oil in said free space, a second shell is a refractory lined chamber occupying substantially the entire extent of said second shell, and having a free space at its top and a body of checkerbrick disposed below said free space, said free space being of sufficient depth and volume for the cracking of the gas oil introduced thereinto substantially completely while the gas oil is in said free space and without contact of any substantial portion of the gas oil while in the liquid phase with said checkerbrick disposed below said free space, and the third shell is a fixing chamber extending substantially the full length of said third shell, containing refractory material with voids therebetween and having its base communicating with the base of said second shell, which process comprises heating said chambers by burning a fluid fuel introduced into the base of said first-mentioned chamber and passing the resultant products of combustion up through the first-mentioned chamber, down through the second-mentioned chamber and up through the fixing chamber to heat said chambers to gas-making temperatures, and generating said high B. t. u. low gravity gas by passing steam into the base of and up through the first-mentioned chamber, introducing gas oil into the top of the first-mentioned chamber and completely vaporzing said gas oil thus introduced in the free space in said first-mentioned chamber by radiant heat in the presence of said steam passing therethrough, passing the resultant mixture of oil vapors and steam into the top of and down through the second-mentioned chamber, simultaneously with the introduction of the gas oil into the first-mentioned chamber, introducing into the top of the second-mentioned chamber gas oil in amount at least 1.5 times the amount of gas oil introduced into the first-mentioned chamber, completely vaporizing the gas oil thus introduced into the second-mentioned chamber while in said free space in said second-mentioned chamber by radiant heat and in the presence of oil vapors and steam passing from the first-mentioned chamber through the second-mentioned chamber, and passing the resultant mixture of oil vapors and steam down through the body of checkerbrick in the second-mentioned chamber and up through and over the hot refractory material in said fixing chamber to produce the combustible gas.

3. The process as defined in claim 2, in which all of the air required for complete combustion of said fluid fuel introduced into the base of said first-mentioned chamber is introduced into the base of said first-mentioned chamber and no additional air is supplied to said set during said heating step, and from one-and-a-half to five times the amount of gas oil is introduced into the second-mentioned chamber as is introduced into the first-mentioned chamber.

4. The process as defined in claim 2, in which all of the air required for complete combustion of said fluid fuel introduced into the base of said first-mentioned chamber is introduced into the base of said first-mentioned chamber and no additional air is supplied to said set during said heating step, from 1½ to 5 times the amount of gas oil is introduced into the second-mentioned chamber as is introduced into the first-mentioned chamber, the heating step is continued until the temperature at the base of the fixing chamber is within the range of from 1400° to 1600° F. and the gas making step is continued until the temperature at the base of the fixing chamber drops about 100° F. and is within the range of from 1300° to 1500° F.

References Cited in the file of this patent

UNITED STATES PATENTS

| | | |
|---|---|---|
| 2,071,285 | Johnson | Feb. 16, 1937 |
| 2,205,554 | Brandegee et al. | June 25, 1940 |
| 2,371,616 | Hall | Mar. 20, 1945 |
| 2,605,176 | Pearson | July 29, 1952 |
| 2,605,177 | Pearson | July 29, 1952 |